United States Patent
Mougin et al.

(10) Patent No.: US 9,581,769 B2
(45) Date of Patent: Feb. 28, 2017

(54) ADAPTER FOR A MULTICONTACT CONNECTOR WITH HOUSING AND ASSOCIATED MULTICONTACT CONNECTOR

(71) Applicant: RADIALL, Aubervilliers (FR)

(72) Inventors: Sylvain Mougin, Le Boulay (FR); Emmanuel Demaret, Tours (FR); Gilles Sourdillon, Meslay (FR)

(73) Assignee: RADIALL, Aubervilliers (FR)

(*) Notice: Subject to any disclaimer, the term of this patent is extended or adjusted under 35 U.S.C. 154(b) by 0 days.

(21) Appl. No.: 14/253,145

(22) Filed: Apr. 15, 2014

(65) Prior Publication Data

US 2014/0308008 A1 Oct. 16, 2014

(30) Foreign Application Priority Data

Apr. 15, 2013 (FR) .................... 13 53390

(51) Int. Cl.
  *G02B 6/36* (2006.01)
  *G02B 6/38* (2006.01)
  *G02B 6/12* (2006.01)

(52) U.S. Cl.
  CPC .......... *G02B 6/3893* (2013.01); *G02B 6/3825* (2013.01); *G02B 6/3878* (2013.01); *G02B 6/3897* (2013.01); *G02B 2006/12166* (2013.01); *Y10T 29/49826* (2015.01)

(58) Field of Classification Search
  USPC .................................................. 385/71, 75
  See application file for complete search history.

(56) References Cited

U.S. PATENT DOCUMENTS

| | | | |
|---|---|---|---|
| 5,066,096 A | 11/1991 | Krausse | |
| 5,283,848 A | 2/1994 | Abendschein et al. | |
| 5,563,971 A | 10/1996 | Abendschein | |
| 5,796,896 A | 8/1998 | Lee | |
| 6,116,788 A | 9/2000 | Melchior et al. | |
| 6,848,834 B1 | 2/2005 | Roehrs et al. | |
| 8,388,235 B1 | 3/2013 | Volker et al. | |
| 8,950,949 B2 * | 2/2015 | Isenhour et al. ................ | 385/89 |
| 2003/0156797 A1 | 8/2003 | Gherardini | |
| 2006/0134990 A1 | 6/2006 | Van Der Mee et al. | |

(Continued)

FOREIGN PATENT DOCUMENTS

| | | |
|---|---|---|
| CH | 706932 A1 | 3/2014 |
| EP | 0 633 485 A1 | 1/1995 |

(Continued)

OTHER PUBLICATIONS

Search Report issued in French Patent Application No. 1353390 dated Mar. 7, 2014 (with translation).

(Continued)

*Primary Examiner* — Eric Wong
(74) *Attorney, Agent, or Firm* — Oliff PLC (57) ABSTRACT

The present invention relates to an adapter (3) for a connector (1), notably for a multicontact connector, of the type comprising at least one insert (2) and one housing (6) comprising, within it, the insert (2). According to the invention, the adapter (3) comprises at least one means for removably fastening, inside the housing (6), a connector in its configuration bearing by its front face (30) against the front face (20) of the insert (2).

14 Claims, 5 Drawing Sheets

(56) References Cited

U.S. PATENT DOCUMENTS

| | | |
|---|---|---|
| 2006/0193562 A1 | 8/2006 | Theuerkorn |
| 2012/0064739 A1* | 3/2012 | Sell ............................. 439/76.1 |
| 2013/0092436 A1* | 4/2013 | Silc et al. .................. 174/74 R |
| 2014/0126859 A1 | 5/2014 | Fabian et al. |
| 2015/0241643 A1* | 8/2015 | Mieville ............. G02B 6/3878 385/59 |

FOREIGN PATENT DOCUMENTS

| | | | |
|---|---|---|---|
| EP | 1 205 779 A2 | 5/2002 | |
| GB | 2472584 A | 2/2011 | |
| JP | 201341089 * | 2/2013 | .............. G02B 6/38 |

OTHER PUBLICATIONS

Written Opinion issued in French Patent Application No. 1353390 (with translation).
Search Report issued in French Patent Application No. 1353389 dated Dec. 16, 2013 (with translation).
Written Opinion issued in French Patent Application No. 1353389 (with translation).
Pending U.S. Appl. No. 14/253,496, filed Apr. 15, 2014.
Nov. 9, 2015 Office Action issued in U.S. Appl. No. 14/253,496.

* cited by examiner

ADAPTER FOR A MULTICONTACT CONNECTOR WITH HOUSING AND ASSOCIATED MULTICONTACT CONNECTOR

The subject of the present invention is an adapter for a connector, notably for a multicontact connector and an associated connector, used notably in the aeronautical/military field and, more generally, in severe environments.

There are currently optical connectors of the type comprising a housing accommodating an insert, this insert comprising a plurality of cavities each receiving an optical contact element. An optical contact element notably comprises a part usually called the ferrule defining an optical face and a body in which the ferrule is mounted and bearing an optical fibre facing the ferrule. An additional part, serving as an adapter, usually called "sleeve holder", is fastened to the insert, this part comprising a plurality of alveoli each extending in the extension of a cavity of the insert. Each alveolus houses an alignment sleeve suitable for housing two ferrules in order to allow the alignment between two optical contact elements that have to be placed facing one another to establish the optical fibre connection.

In these known optical connectors, in order to allow access to each ferrule and each alignment sleeve to allow, during maintenance, each contact optical face to be visually inspected and, if necessary, cleaned, the fastening of an adapter to an insert is designed to be removable by a screw-fastening generally provided in a central location on the front face of the adapter. Thus, the removable dismantling of the adapter allows both visual access and access for a cleaning means, such as an alcohol-soaked swab, inside each alignment sleeve and for each optical face, which cannot be done satisfactorily through the alveolus of the "sleeve holder".

These known optical connectors may be those marketed by the company RADIALL under the range name LuxCis®, notably the connectors from the EPXA and B series. Reference may advantageously be made to the patent application US2006/134990.

Although, in these known optical connectors, the solution of removable screw fastening of the adapter to the insert is satisfactory for the abovementioned cleaning, it has the drawback of resulting in a loss of density of the optical contacts through the amount of space intrinsically required by the screws and their housings.

There are also optical contacts housed in an insert, in which the optical contact element is mounted with axial float inside a cavity of the insert.

More specifically, a ferrule is mounted inside the insert, also defining an optical face. The female insert bears, within it, an alignment sleeve suitable for housing the ferrule and bears an optical fibre facing the ferrule. The ferrule passes through the alignment sleeve and protrudes from the insert in order to allow the optical face to be cleaned.

These known optical contacts are therefore mounted in the cavities of connector inserts.

These known optical contacts may be those marketed by the company RADIALL.

The major drawback with these optical contacts is that cleaning an alignment sleeve necessarily entails dismantling the actual contact, with the inherent risk of pollution upon the reinsertion of said sleeve during reassembly.

There is therefore a need to improve the connectors of optical type notably in order to increase the optical contact density and to facilitate the cleaning of the alignment sleeves housing the ferrules of the optical contacts.

The aim of the invention is to at least partly meet this need.

Thus, the subject of the invention is an adapter for a connector, notably for a multicontact connector of the type comprising at least one insert and one housing comprising, within it, said at least one insert, the insert comprising at least one cavity suitable for at least partially housing an optical contact element, the insert having a front face on which each cavity emerges, the adapter comprising at least one alveolus suitable for housing an alignment sleeve, notably slotted, the adapter having a front face on which each alveolus emerges, the adapter being configured to be arranged with its front face bearing against the front face of the insert so as to have each alignment sleeve housed in a alveolus which receives a ferrule of an optical contact element housed in a cavity.

According to the invention, the adapter comprises at least one means for removably fastening, inside the housing, a connector, in its configuration bearing by its front face against the front face of the insert. The removable fastening means of the adapter is at least one snap-fitting snug arranged on one of its side faces to its front face, the snap-fitting snug being suitable for snap-fitting in a snap-fitting notch arranged in the internal wall of the housing of a connector.

"Comprising, within it", should be understood to mean, within the context of the invention, that the insert may be removably fastened to the housing, or permanently fastened to the housing, or form an integral part of the housing, that is to say produced in a single piece with the housing.

The adapter according to the invention makes it possible to easily and rapidly mount/remove a connector housing, notably a multicontact connector housing.

By virtue of the invention, by simply removing the adapter, it is possible to have visual and cleaning access to both the interior of the alignment sleeves which remain housed in the adapter and to the optical faces of the optical elements of female type housed in the cavities of the insert and which protrude outwards once the adapter is removed.

Furthermore, because of its removable fastening to the housing of the connector, the possible density of the optical contacts in one and the same connector is increased, compared to a removable screw-fastening of the adapter to the insert of the connector. In other words, the screw-fastening solution according to the prior art, which intrinsically implies a necessary space for the screw and therefore a lesser amount of space available for the optical contact elements, is dispensed with.

Preferably, the adapter comprises two snap-fitting snugs, one being arranged on a first of its side faces and the other being arranged on a second of its side faces, opposite the first.

Advantageously, the adapter has a clearance space allowing access for a part of a snap-fit releasing tool, such as a nose of a snap-fitting snug gripping tool (P), from the rear face of the adapter opposite its front face, and between one of its side faces and the internal wall of the housing of a connector, in order to release the adapter from the housing. Thus, by inserting the noses of a gripping tool for the adapter on either side and inside the housing, the noses may be abutted on the snap-fitting snugs, which brings them mutually closer together and releases the snugs and, therefore, the adapter from the inside of the housing.

According to an advantageous variant embodiment, the adapter comprises two parts assembled together, notably by gluing, one defining the front face, the other defining the rear face of the adapter opposite its front face.

Preferably, the adapter is produced in at least one electrically insulating material, notably a plastic material.

Also preferably, the snap-fitting snug or snugs is (are) obtained by moulding with one of its constituent parts.

In an exemplary implementation of the invention, the first type of alveoli comprises at least one securing lip, notably two securing lips, each arranged at an end of the alveoli, this lip or these lips being able to be elastically deformable or not, notably annular, and arranged to secure an alignment sleeve introduced into this alveolus.

According to an advantageous feature, the alveolus or alveoli extends (extend) from the front face to the rear face of the adapter.

According to an advantageous variant embodiment, the alveolus or alveoli comprises (comprise) at least one securing lip, notably two securing lips, each arranged at an end of the alveolus, this lip or these lips, notably annular, being suitable for securing an alignment sleeve housed in this alveolus.

Preferably, the alignment sleeve or sleeves, notably slotted, is (are) made of ceramic.

The front face and the rear face of the adapter may be of generally substantially rectangular or square form or, as a variant, each have a generally substantially disc faint.

Another subject of the invention is a connector, notably a multicontact connector, comprising:

at least one insert comprising at least one cavity suitable for at least partially housing an optical contact element, the insert having a front face on which each cavity emerges, a housing comprising, within it, said at least one insert, at least one adapter comprising at least one alveolus suitable for housing an alignment sleeve, notably slotted, the adapter having a front face on which each alveolus emerges, the adapter being configured to be arranged with its front face bearing against the front face of the insert so as to have each alignment sleeve housed in a alveolus which receives a ferrule of an optical contact element housed in a cavity of the insert, wherein the housing comprises at least one fastening means and in that the adapter comprises at least one removable fastening means cooperating with the fastening means of the housing for removably fastening the adapter inside the connector housing, in its configuration bearing by its front face against the front face of the insert.

According to the invention, the fastening means of the adapter consists (consist) of at least one snap-fitting snug arranged on one of its side faces to its front face, the snap-fitting snug being suitable for snap-fitting in a notch arranged in the internal wall of the connector housing.

The housing may have at least a rectangular or square cross section or, as a variant, at least a circular cross section.

Another subject of the invention is a method for producing optical connections, using a first connector comprising a first insert with cavities, a second connector suitable for being coupled to the first, comprising a second insert with cavities, and an adapter as described previously, one of the first and second connectors comprising a housing comprising, within it, the first or the second insert, the method comprising the following steps:

removably fastening the adapter to the housing of one of the first and second connectors, mounting optical contact elements on the first and second inserts, coupling the connectors in such a way that the adapter is sandwiched between the inserts, and producing optical connections between the connectors.

The final subject of the invention is a method for maintaining a connector described previously, comprising the following steps:

removing the adapter from the housing of the connector, if necessary, cleaning, using an alcohol-soaked swab, the inside of the alignment sleeve or sleeves housed in the adapter, if necessary, cleaning, notably using an alcohol-soaked swab, the optical face or faces each defined by the ferrule of an optical contact element, when any cleaning has been completed, reassembling by removably fastening the adapter inside the housing.

The first and second inserts may be known per se.

The adapter of a connector, notably a multicontact connector, according to the invention may also comprise one or more alveolus for housing male and/or female electrical contact elements housed in the cavities of an insert. In other words, the invention applies also to a connector, notably a hybrid multicontact connector, that is to say one or more optical contact elements with one or more electrical contacts.

The invention will be able to be better understood on reading the following detailed description of non limiting exemplary implementations of the invention, and on studying the attached drawing, in which:

For clarity, the same references designating the same elements of a connector according to the prior art and a connector according to the invention are used for all the FIGS. 1 to 7D.

Figure 1:
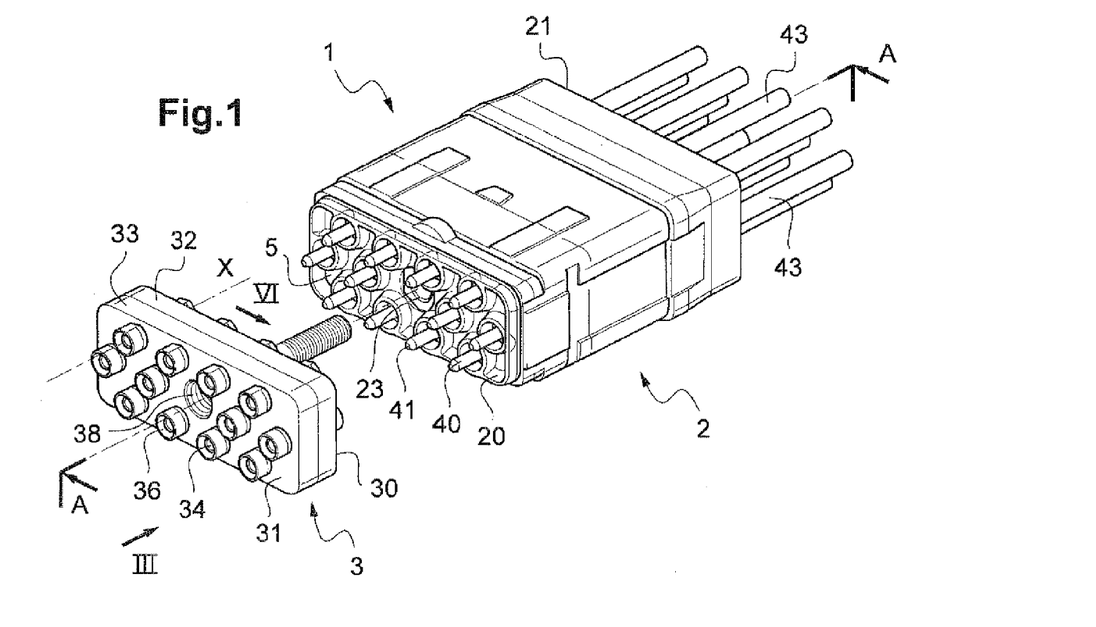
FIG. 1 represents, schematically and partially, in perspective, different elements of a first multicontact connector according to the prior art.
Figure 1A:
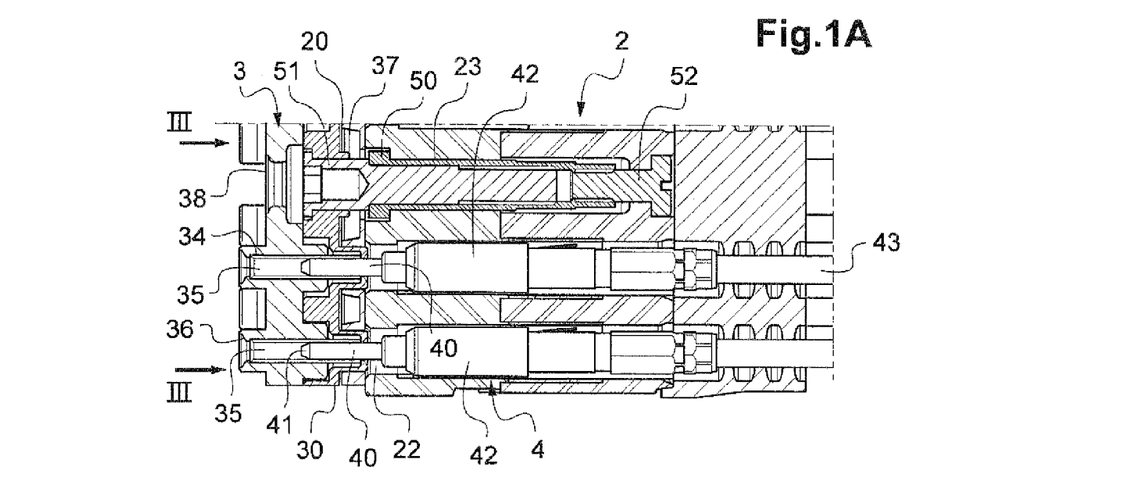
FIG. 1A represents, in longitudinal cross section along A-A, the elements of FIG. 1, assembled together.
Figure 2:
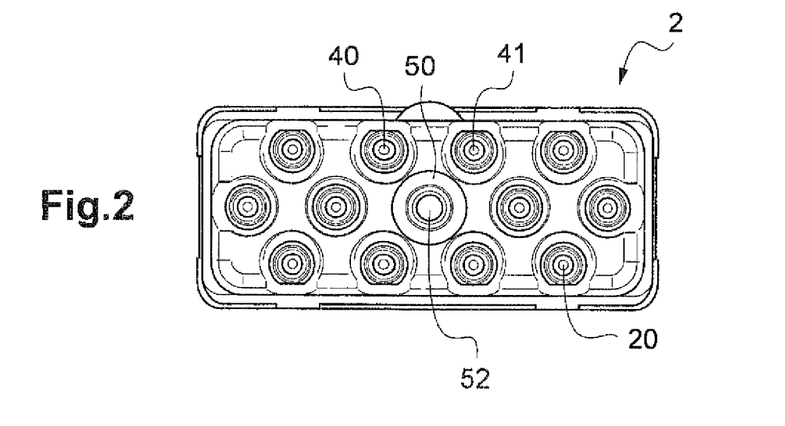
FIG. 2 is a front view according to II-II, of the insert of the connector of FIG. 1.
Figure 3:
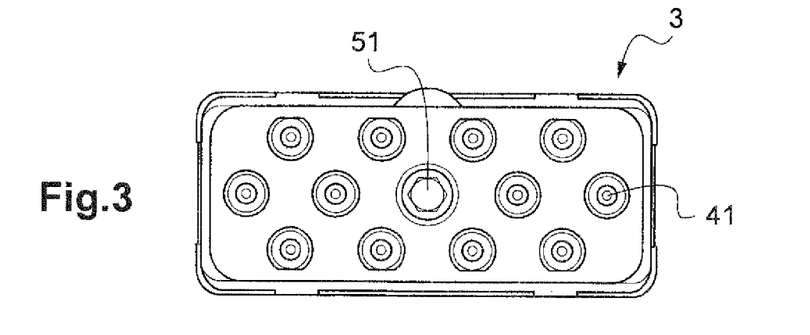
FIG. 3 is a front view according to of the insert of the connector of FIG. 1A.

FIGS. 1 to 3 show the various elements of a multicontact connector according to the prior art, globally designated by the reference 1.

Such a connector 1 mainly comprises an insert 2, an adapter 3 and optical contact elements 4 housed in the insert 2.

The insert 2 has a substantially parallelepipedal form, with front 20 and rear 21 faces. The insert 2 also comprises a plurality of cavities 22 extending parallel to its longitudinal axis X, between the rear 21 and front 20 faces.

In the example considered, the cavities 22 are all identical.

Each cavity 22 may indiscriminately receive an optical contact element 4. As a variant, it is possible to provide, on the insert 2, at least two cavities having different forms. Thus, although not represented, the insert 2 may also be configured so that at least one of the cavities 22 receives an electrical contact element.

Each optical contact element 4 comprises a ferrule 40 defining an optical face 41 and a body 42 in which the ferrule 40 is mounted and bearing an optical fibre 43 facing the ferrule 40. The ferrule 40 is mounted in the body 42 with an axial float along the axis X.

The insert 2 also comprises a drill-hole 23 making it possible to receive elements 5 for removably fastening the adapter 3 to the insert 2.

These fastening elements 5 comprise, for example, an internally threaded sleeve 50 in which a first screw 51 may be fastened at an end and a second screw 52 can be fastened at an opposite end.

The insert 2 and the optical contact elements 4 may be of the type of those used in the optical connectors marketed by the company RADIALL under the range name LuxCis®, notably the connectors from the EPXA and B series.

The adapter 3 has a first main face 30 intended to be applied against the front face 20 of the insert 2 and a second main face 31 opposite the first 30.

In the example considered, the faces 30 and 31 are substantially planar and have a substantially rectangular form.

The adapter 3 comprises two elements 32 and 33 assembled together, the element 32 defining the first face 30 and the element 33 defining the second face 31.

In the example considered, the elements 32 and 33 are made of an electrically insulating material, notably of a plastic material.

The adapter 3 comprises a plurality of alveolis 34 in each of which is fitted an alignment sleeve 35 which is slotted, which is itself suitable for housing a ferrule 40 of an optical contact element 4, as illustrated in FIG. 1A.

Each alveolus 34 comprises, at each of its ends, a securing lip 36 making it possible to secure the slotted alignment sleeve 35 in the alveolus 34.

Each securing lip 36 is produced on a tubular portion protruding on the first face 30 or the second main face 31 of the adapter 3.

Each of the alveolus 34 of the adapter 3 is intended to be arranged in the extension of a cavity 22 of the insert 2 to allow a ferrule 40 to be housed in the alignment sleeve 35.

As illustrated, the multicontact connector according to the prior art comprises twelve alveoli 34 distributed in three rows each of four alveoli.

As a variant, there may be more or less alveoli 34, the adapter 3 being able to comprise, for example, a single alveolus 34. The multicontact connector 1 is then reduced to a single-contact connector.

The adapter 3 has a housing 37 making it possible to receive the head of the first screw 51 for removably fastening the adapter 3 to the insert 2. The housing 37 and therefore the head of the first screw 51 is accessible for a screwdriver through the drill-hole 38.

As illustrated, the housing 37 is produced in a central location of the adapter 3.

The head of the first screw 51 may be placed in the housing 37 at the time of assembly of the elements 32 and 33 of the adapter 3.

The adapter 3 is assembled with the insert 2 by screwing the first screw 51 onto the internally threaded sleeve 50.

In such a multicontact connector 1 according to the prior art, an optical contact element 4 may be introduced into, that is to say housed in, a cavity 22 and a alveolus 34 such that the ferrule 40 of the optical contact element 4 is engaged in the slotted sleeve 35, as illustrated in FIG. 1A.

The connector 1 is intended to be coupled to a complementary connector (not represented) comprising an insert identical to the insert 2 receiving identical optical contact elements.

Figure 4:
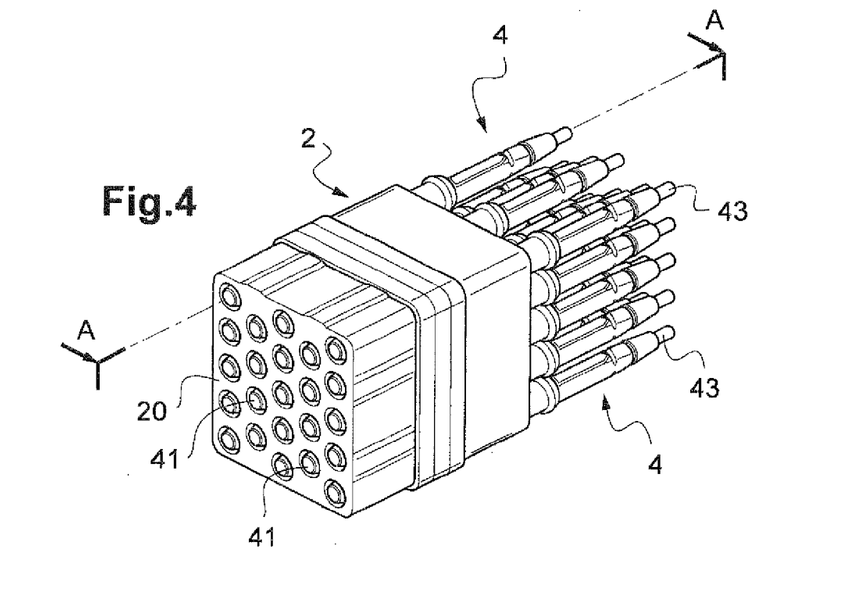
FIG. 4 is a schematic view, in perspective, of a plurality of optical contact elements in an insert according to the prior art.
Figure 4A:
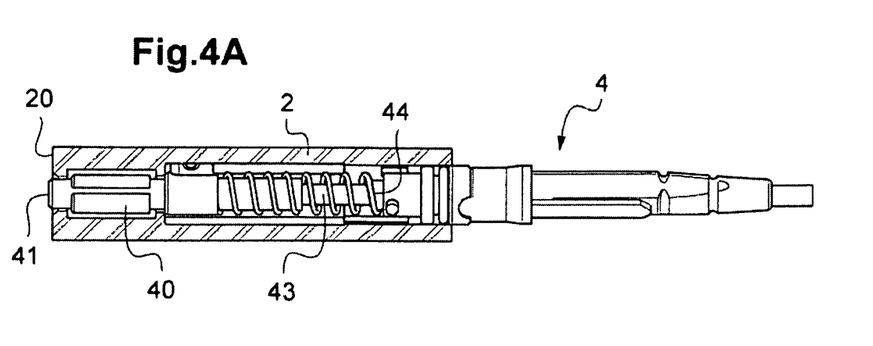
FIG. 4A represents, in longitudinal cross section according to A-A, an optical contact element of FIG. 4 as housed in the insert according to the prior art.

FIGS. 4 and 4A show the various elements of an optical contact element 4 respectively with an insert 2 according to the prior art.

Each of these optical contact elements 4 represented in FIGS. 4 and 4A comprises a ferrule 40 that also defines an optical face 41 and an insert 2 in which the ferrule 40 is mounted and bearing an optical fibre 43 facing the ferrule 40.

The insert 2 thus houses each ferrule 40 of an optical contact 4. The ferrule 40 is thus mounted in the insert 2 with the fitting of the ferrule 40 in the insert 2 and with an axial float and of the ferrule 40 in the insert 42 by virtue of the helical compression spring 44.

In order to remedy the major drawbacks of the optical connectors and optical contacts housed in an insert according to the prior art which have just been described, notably a lesser optical contact density linked to the presence of the central screw-fastening system 50, 51, 52 of the connector of FIGS. 1 and 1A, and the difficulty in cleaning the alignment sleeves 35 of the optical contacts of FIGS. 4 and 4A, the inventors have devised a novel configuration for removably fastening the adapter inside the housing 6 of a connector 1.

Thus, an adapter 3 according to the invention comprises at least one means for removably fastening, inside the housing 6, a connector, in its configuration bearing by its front face 30 against the front face 20 of the insert 2. Preferably, the removable fastening is produced by snap-fitting.

The advantages obtained by an adapter according to the invention compared to an adapter according to the prior art are many, notably as follows:
  increased density of optical contact elements because of the absence of the (screw) fastening means which pass through the adapter;
  ease of dismantling with a tool, such as a sharp-nosed gripping tool that can usually be found in the field of electronics;
  perfect guidance of the optical contact element directly into the housing.

Figure 5:
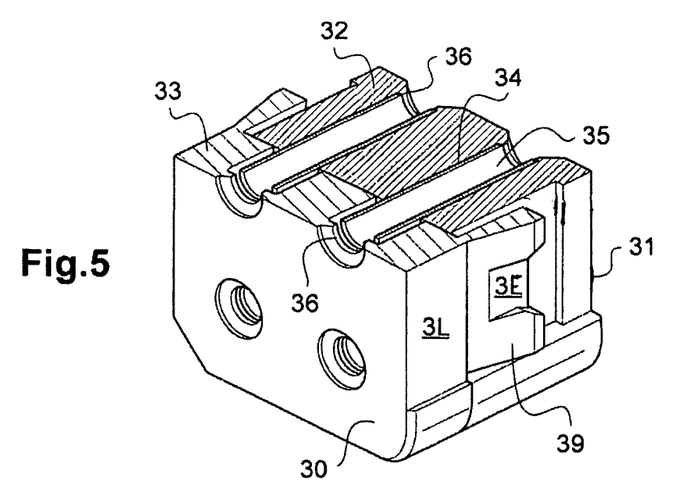
FIG. 5 is a schematic and partial view, in perspective, of an adapter according to the invention.

In the example illustrated in FIG. 5, the adapter 3 comprises two snap-fitting snugs 39. One of the snugs 39 is arranged on one of the side faces 3L to the front face 30 of the adapter 3. The other snap-fitting snug 39 is arranged on the opposite side face 3L. Each snap-fitting snug 39 is suitable for being snap-fitted in a snap-fitting notch 61 provided for this purpose, arranged in the internal wall of the housing 6 of a connector 1.

Figure 6A:
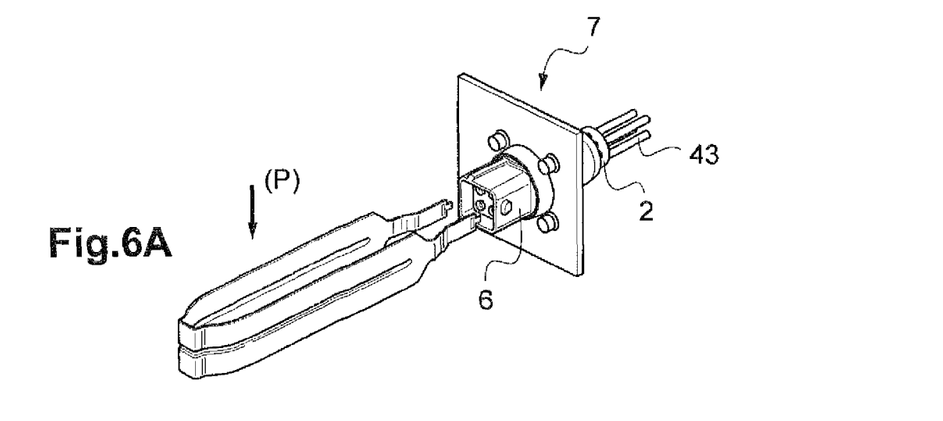
FIGS. 6A to 6C show, by a perspective view, the various steps of removal using a tool for gripping an adapter removably fastened to a multicontact connector housing according to the invention.

Moreover, as shown in FIG. 6, the adapter 3 according to the invention whose front 30 and rear 31 faces are of generally square form, comprises a plurality of alveoli 34 each suitable for housing an alignment sleeve 35, notably slotted.

Each alveolus 34 extends from the front face 30 to the rear face 31 of the adapter 3.

Each alveolus 34 comprises two securing lips 36 of annular form, each being arranged at an end of the alveolus. These lips 36 secure an alignment sleeve 35, made of ceramic, housed in this alveolus 34.

The insert 2 may be standard, such as that according to the prior art described with reference to FIGS. 1 and 1A and marketed under the marketing reference of the EPX connector by the company RADIALL.

There now follows a description of the steps in producing optical connections, using a multicontact connector 1 according to the invention, comprising an insert 2 with cavities 22, a housing 6 inside which the insert 2 is fastened and an adapter 3 which has just been described. The procedure is as follows:

removably fasten the adapter 3 to the housing 6 of the multicontact connector 1, mount optical contact elements on the insert 2 of the connector 1 and on an insert which is not represented of a multicontact connector complementing the connector 1, couple the connector 1 and the complementary connector in such a way that the adapter 3 is sandwiched between the inserts, and produce the optical connections between the connectors.

There now follows a description, with reference to FIGS. 6A to 7D, of the steps in dismantling an adapter according to the invention from the housing in order to maintain it, that is to say for visual access and, if necessary, to clean the inside of each of the alignment sleeves 35 and each optical face 41 of the ferrule 40 of the optical contact elements 4.

Figure 7A:
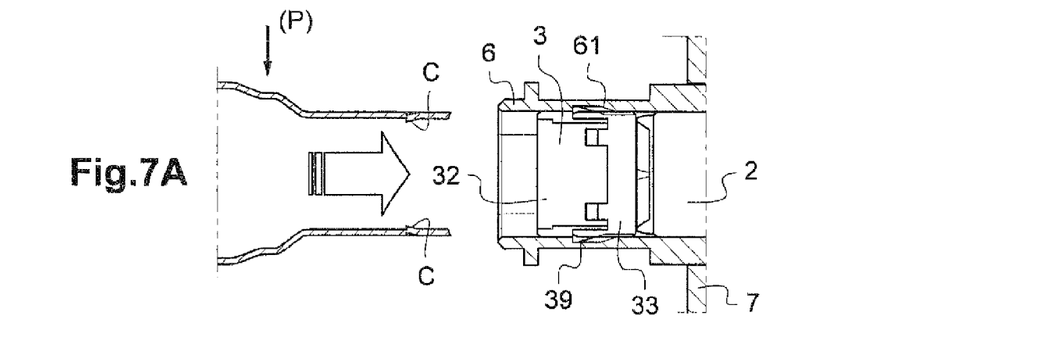
FIGS. 7A to 7D show, by a cross sectional view, the different steps of removal using a tool for gripping an adapter removably fastened to a multicontact connector housing according to the invention, FIGS. 7A to 7C respectively corresponding to FIGS. 6A to 6C, FIG. 7D corresponding to the step of removing the already dismantled adapter from its gripping tool.

In the optical connection configuration, the adapter 3 according to the invention is arranged with its front face 30 bearing against the front face 20 of the insert 2 with each alignment sleeve 35 housed in a alveolus 34 which receives a ferrule 40 of an optical contact element 4 housed in a cavity 22 (FIGS. 6A and 7A).

An operator who wants to dismantle the adapter 3 according to the invention then moves a sharp-nosed gripping tool (P), as extraction tool, towards the front of the housing 6, that is to say the side of the free or rear face 31 of the adapter 3 (FIGS. 6A and 7A).

Figure 6B:
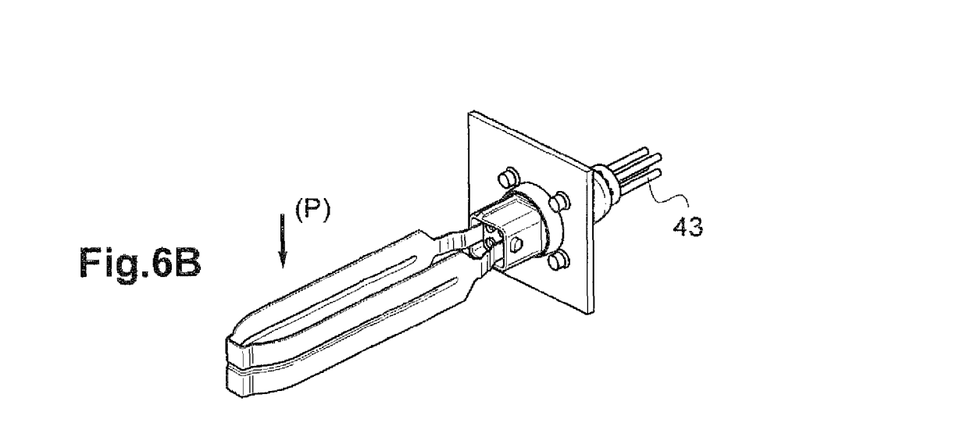
Figure 7B:
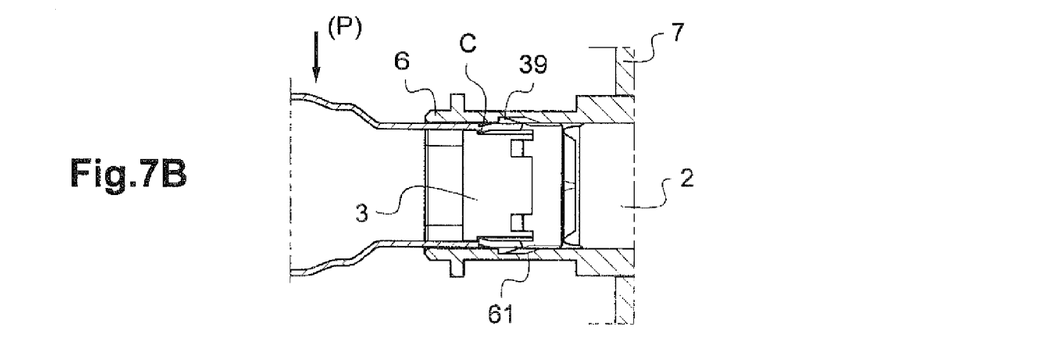

He or she thus inserts the noses of the gripping tool (P) between the side faces 3L and the inside of the housing 6, that is to say, each in the clearance space 3E provided for this purpose, until each of the noses is in abutment against one of the snap-fitting snugs 39 of the adapter (FIGS. 6B and 7B).

The abutting of the noses of the tool against the snugs 39 causes the two noses to move closer together and thus release, or, to put it another way, unclip the two snugs 39 previously snap-fitted into the notches 61 of the internal wall of the housing 6.

Figure 6C:
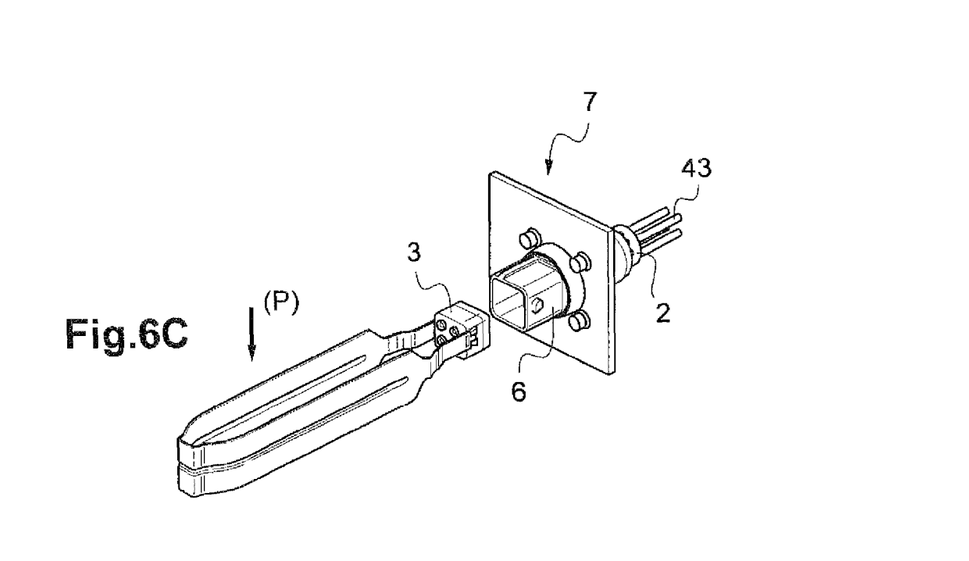
Figure 7C:
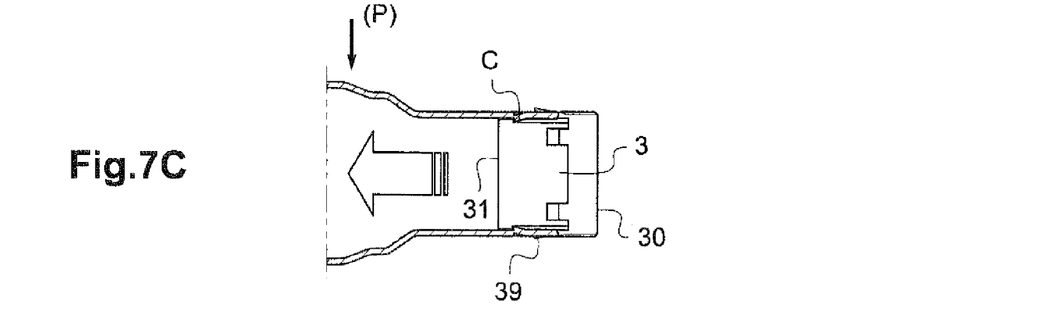

The operator may then proceed to extract the adapter 3 from the housing 6 of the connector 1, by gripping with the gripping tool (FIGS. 6C and 7C). To this end, the tool (P) includes, on each of the noses, a hook (C) which hooks the adapter 3 by its side faces 3L.

Figure 7D:
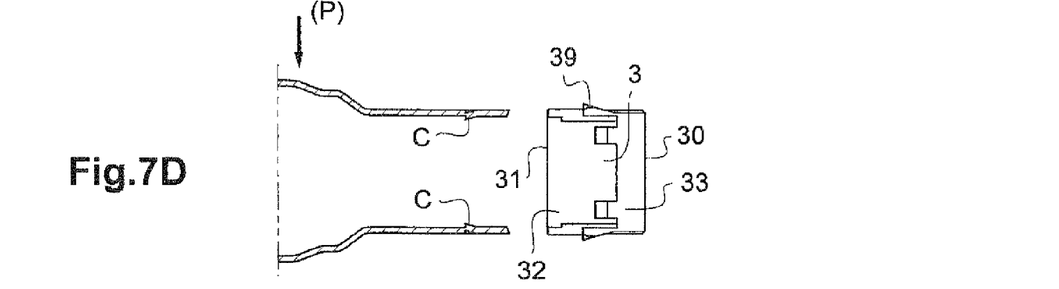

The operator finally releases the adapter 3 from the gripping tool (FIG. 7D).

Once the adapter 3 has been dismantled, the operator may proceed to visually inspect all the alignment sleeves 35 housed in the adapter 3. If necessary, he or she may also clean their interior, notably using an alcohol-soaked swab.

Similarly, the operator may proceed to visually inspect all the optical faces 41 each defined by the ferrule 40 of an optical contact element 4. If necessary, he or she may also clean them, notably using an alcohol-soaked swab.

Once any cleaning has been completed, the operator may then reassemble the adapter 3 inside the housing 6 and once again snap fit it therein.

Obviously, the invention is not limited to the exemplary implementations which have just been described.

In particular, although the connector 1 represented houses only optical contact elements in the insert 2, the invention also applies to a connector 1 which also houses one or more male and/or female electrical contact elements in the insert 2.

The invention claimed is:

1. An adapter for a connector, the connector comprising (i) at least one insert, the insert comprising at least one cavity suitable for at least partially housing an optical contact element, the insert having a front face on which each cavity emerges, and (ii) a housing, the housing having an internal wall and being configured to house the insert, and the adapter comprising:

at least one alveolus configured to house an alignment sleeve that is slotted;

a front face of the adapter, the at least one alveolus extending from a rear face of the adapter to the front face of the adapter, the front face of the adapter being configured to bear against a front face of the insert such that the alignment sleeve housed in the at least one alveolus receives a ferrule of an optical contact element housed in a cavity;

means for removably fastening the adapter to the connector at an inside of the housing of the connector, the means for removably fastening comprising two snap-fitting snugs, one snap-fitting snug being arranged on a first side face of the adapter, and another snap-fitting snug being arranged on a second side face of the adapter, the second side face being arranged opposite to the first side face, wherein each snap-fitting snug is suitable for snap-fitting in a snap-fitting notch arranged in an internal wall of the housing of a connector; and a clearance space that allows access for each of the noses of a sharp-nosed gripping tool, as an extraction tool, from the rear face of the adapter, which is opposite the front face of the adapter, and between (i) at least one of the first side face of the adapter and the second side face of the adapter, and (ii) the internal wall of the housing, in order to release the adapter from the housing, whereby the clearance space allows the noses of the sharp-nosed gripping tool to be inserted in a direction towards the front of the housing, between the side faces of the adapter and the internal wall of the housing, until the noses each abut against one of the snap-fitting snugs, and the adapter being configured so that such abutment causes the noses to move closer together and unclip the two snap-fitting snugs that were snap-fitted into the snap-fitting notches.

2. The adapter according to claim 1, wherein the adapter comprises two parts assembled together, first part defining the front face of the adapter, and a second part defining the rear face of the adapter.

3. The adapter according to claim 1, wherein the adapter is produced in at least one electrically insulating material.

4. The adapter according to claim 1, wherein the snap-fitting snugs are molded to the adapter.

5. The adapter according to claim 1, wherein the at least one alveolus comprises at least one securing lip, the at least one securing lip (i) being arranged at an end of the alveolus, (ii) having an annular form, and (iii) being suitable for securing the alignment sleeve housed in the at least one alveolus.

6. The adapter according to claim 1, wherein the alignment sleeve is made of ceramic.

7. The adapter according to claim 1, wherein the front face of the adapter and the rear face of the adapter are of substantially rectangular or square form.

8. The adapter according to claim 1, wherein the front face of the adapter and the rear face of the adapter are of substantially disc form.

9. A connector comprising:
at least one insert comprising at least one cavity suitable for at least partially housing an optical contact element, the insert having a front face on which each cavity emerges;
a housing having an internal wall, the housing being configured to house the insert; and
at least one adapter comprising:
at least one alveolus configured to house an alignment sleeve that is slotted;
a front face of the adapter, the at least one alveolus extending from a rear face of the adapter to the front face of the adapter, the front face of the adapter being configured to bear against a front face of the insert such that the alignment sleeve housed in the at least one alveolus receives a ferrule of an optical contact element housed in a cavity;
means for removably fastening the adapter to the connector at an inside of the housing of the connector, the means for removably fastening comprising two snap-fitting snugs, one snap-fitting snug being arranged on a first side face of the adapter, and another snap-fitting snug being arranged on a second side face of the adapter, the second side face being arranged opposite to the first side face, wherein each snap-fitting snug is suitable for snap-fitting in a snap-fitting notch arranged in an internal wall of the housing of a connector; and
a clearance space that allows access for each of the noses of a sharp-nosed gripping tool, as an extraction tool, from the rear face of the adapter, which is opposite the front face of the adapter, and between (i) at least one of the first side face of the adapter and the second side face of the adapter, and (ii) the internal wall of the housing, in order to release the adapter from the housing, whereby the clearance space allows noses of the sharp-nosed gripping tool to be inserted in a direction towards the front of the housing, between the side faces of the adapter and the internal wall of the housing, until the noses each abut against one of the snap-fitting snugs, and
the adapter being configured so that such abutment causes the noses to move closer together and unclip the two snap-fitting snugs that were snap-fitted into the snap-fitting notches.

10. A method for producing optical connections, using a first connector comprising a first insert with cavities, a second connector suitable for being coupled to the first connector, the second connector comprising a second insert with cavities, and an adapter according to claim 1, at least one of the first connector and the second connector comprising a housing, the housing being configured to house either the first insert or the second insert, the method comprising the following steps:
removably fastening the adapter to the housing;
mounting optical contact elements on the first insert and the second insert;
coupling the connectors in such a way that the adapter is sandwiched between the first insert and the second insert; and
producing optical connections between the connectors.

11. A method for maintaining a connector according to claim 9, comprising the following steps:
removing the adapter from the housing of the connector,
if necessary, cleaning, notably using an alcohol-soaked swab, the inside of the alignment sleeve or sleeves housed in the adapter,
if necessary, cleaning, notably using an alcohol-soaked swab, the at least one face defined by the ferrule of an optical contact element,
when any cleaning has been completed, reassembling, by removably fastening the adapter inside the housing.

12. The adapter according to claim 1, wherein the snap-fit releasing tool is a nose of a snap-fitting snug gripping tool.

13. The adapter according to claim 3, wherein the at least one electrically insulating material is a plastic material.

14. The adapter according to claim 1, wherein the connector is a multicontact connector.

* * * * *